(12) United States Patent
Doddapaneni et al.

(10) Patent No.: US 8,661,518 B2
(45) Date of Patent: Feb. 25, 2014

(54) N-PORT ID VIRTUALIZATION (NPIV) PROXY MODULE, NPIV PROXY SWITCHING SYSTEM AND METHODS

(75) Inventors: Krishna Doddapaneni, Sunnyvale, CA (US); Chaitanya Kodeboyina, San Jose, CA (US); J.R. Rivers, Saratoga, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1122 days.

(21) Appl. No.: 11/762,575

(22) Filed: Jun. 13, 2007

(65) Prior Publication Data
US 2008/0313724 A1  Dec. 18, 2008

(51) Int. Cl.
G06F 7/04 (2006.01)

(52) U.S. Cl.
USPC ............................................................ 726/9

(58) Field of Classification Search
USPC ........................................................ 726/9, 12
See application file for complete search history.

(56) References Cited

U.S. PATENT DOCUMENTS

| | | | |
|---|---|---|---|
| 2003/0131182 A1* | 7/2003 | Kumar et al. | 711/5 |
| 2004/0078419 A1* | 4/2004 | Ferrari et al. | 709/201 |
| 2007/0147267 A1* | 6/2007 | Holland | 370/252 |
| 2007/0268825 A1* | 11/2007 | Corwin et al. | 370/230 |

* cited by examiner

Primary Examiner — Philip Chea
Assistant Examiner — Daniel Hoang
(74) Attorney, Agent, or Firm — Schwegman Lundberg & Woessner, P.A.

(57) ABSTRACT

Embodiments of an N-Port ID virtualization (NPIV) proxy module, NPIV proxy switching system, and methods are generally described herein. Other embodiments may be described and claimed. In some embodiments, login requests are distributed over a plurality of available N-ports to allow servers to be functionally coupled to F-ports of a plurality of fiber-channel (FC) switches. Fiber-channel identifiers (FC-IDs) are assigned to the servers in response to the logon requests to provide single end-host operations for each of the servers.

18 Claims, 4 Drawing Sheets

N-PORT ID VIRTUALIZATION (NPIV) PROXY MODULE, NPIV PROXY SWITCHING SYSTEM AND METHODS

TECHNICAL FIELD

Some embodiments pertain to fiber-channel (FC) networks. Some embodiments pertain to server virtualization in storage area networks (SANs).

BACKGROUND

In data centers, servers may connect to various target devices, such as small-computer system interface (SCSI) discs, through FC switches. Conventionally, each server may connect to an FC switch using a single port. These ports are referred to as N-ports from the server side and F-ports from the FC switch side. The FC switches conventionally allocate a single FC address, sometimes referred to as a fiber-channel identifier (FCID) or N-port ID, to each server.

There are systematic issues with the connection of servers and storage devices through a FC switch, including interoperability issues that arise with the connection of FC switches from different system vendors. Other issues include the increasing difficulty associated with managing the domain ID space in a large FC data center network because each FC switch may need a domain ID.

N-port ID Virtualization (NPIV) is FC facility allowing multiple N-port IDs to share a single physical N-port. If a FC switch supports NPIV, the switch can allocate multiple FCIDs on the same physical port. Some data centers may implement server virtualization to allow servers to acquire multiple N-port IDs over a single N-port. One N-port may be assigned for each distinguishable logical entity or virtual machine (e.g., a virtual server).

Thus, there are general needs for systems and methods for attachment of multiple physical and/or logical endpoints to a FC network. There are also general needs for systems and methods that utilize NPIV for attachment of multiple physical and/or logical endpoints to a FC network.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
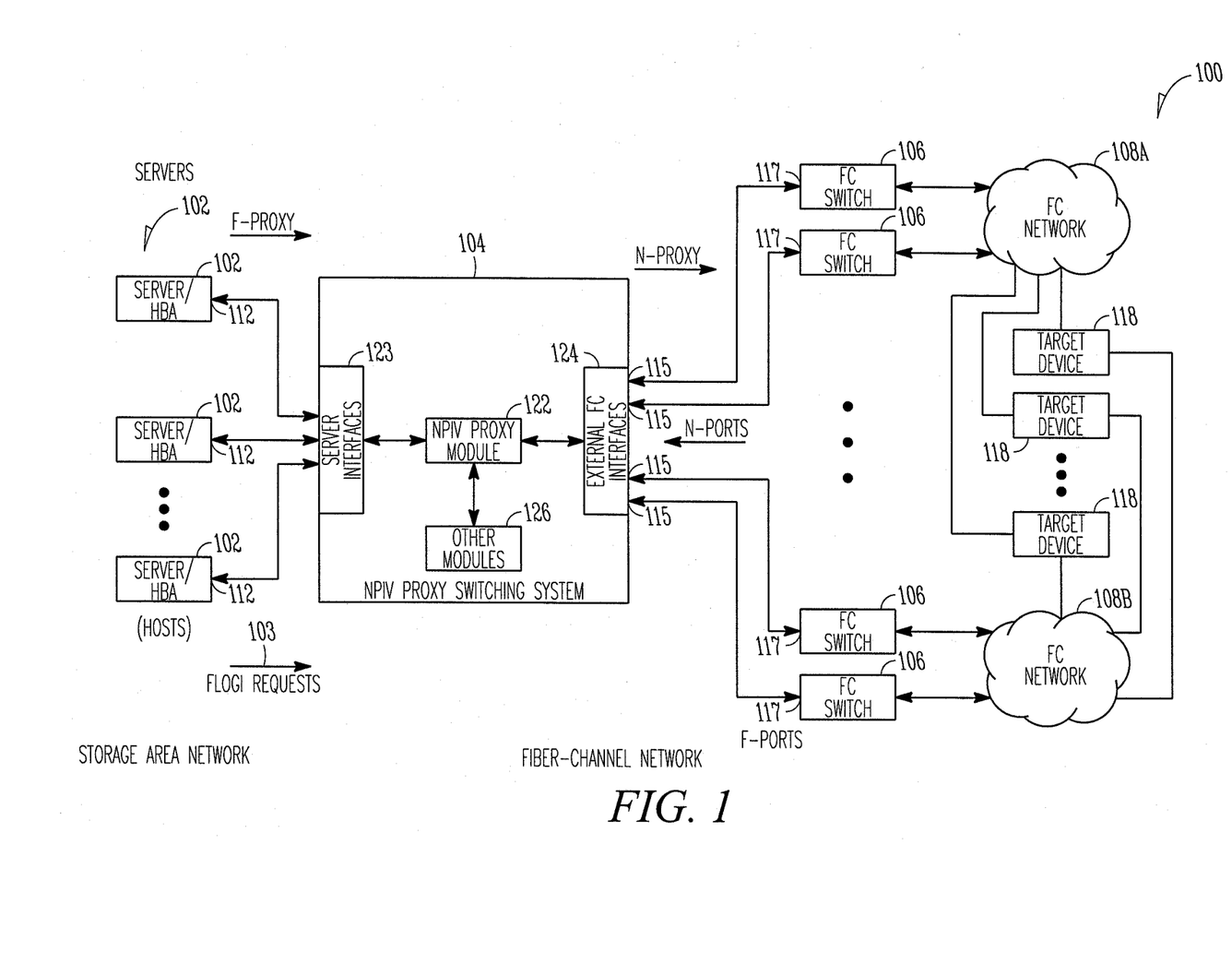
FIG. 1 is a functional diagram of an NPIV proxy switching system operating within a FC network in accordance with some embodiments of the present invention.

FIG. 1 is a functional diagram of an NPIV proxy switching system operating within a FC network in accordance with some embodiments of the present invention. FC network 100 may include a plurality of servers 102, NPIV proxy switching system 104, FC switches 106, FC networks 108 and target devices 118. Servers 102 may comprise a storage area network (SAN), and may utilize one or more of target devices 118 to store data. In some embodiments, servers 102 may comprise a virtual SAN (VSAN), although the scope of the invention is not limited in this respect.

NPIV proxy switching system 104 may include server interfaces 123 to interface with physical or logical host-bus adaptors (HBAs) of servers 102, and external interfaces 124 to interface with FC switches 106. NPIV proxy switching system 104 includes NPIV proxy module 122 to perform an NPIV proxy process to allow NPIV proxy switching system 104 to act as a single-end host for servers 102. NPIV proxy switching system 104 may also include other modules 126 to support the operations of NPIV proxy switching system 104. External interfaces 124 may be associated with one or more N-ports 115 to couple with F-ports 117 of FC switches 106. These embodiments are described in more detail below.

In some embodiments, NPIV proxy module 122 may distribute login requests 103 over available N-ports 115 to allow servers 102 to be functionally coupled to F-ports 117. In response to login requests 103, NPIV proxy module 122 may assign fiber-channel identifiers (FCIDs) to servers 102 which may allow NPIV proxy module 122 to operate as a single end-host for each of the servers 102. In some embodiments, the operations performed by NPIV proxy module 122 may be initiated by one or more state machines, discussed in more detail below. In some of these embodiments, a physical or logical HBA of one of servers 102 may issue an F-port login (FLOGI) request, which may be intercepted by NPIV Proxy module 122. NPIV proxy module 122 may select one of N-ports 115 to associate the server with. NPIV Proxy module 122 may then issue a proxy FLOGI to the selected N-port. The FC switch 106 associated with the selected N-port may return an LS_ACC to NPIV proxy module 122 which may relay this to the requesting HBA. Accordingly, servers 102 may communicate using their assigned FCIDs with target devices 118 through one of a plurality of FC networks 108. In these embodiments, servers 102 use login requests 103 to request an FCID to allow servers 102 to communicate with target devices 118. In these embodiments, the FCIDs are provided by NPIV proxy module 122. This is unlike some conventional server systems in which severs request FCIDs directly from the FC switches. Although some embodiments of the present invention are applicable to server systems and networks that implement NPIV, the scope of the invention is not limited in this respect. Embodiments of the present invention may also be applicable to server systems and networks, including servers that do not implement NPIV.

In some embodiments, NPIV proxy module 122 may be configured to uniformly distribute login requests 103 over N-ports 115 to achieve a substantially uniform distribution. The substantially uniform distribution may consider login requests previously distributed to the N-ports 115. In these embodiments, the number of existing requests may be considered by NPIV proxy module 122 when distributing a login request 103 received from one of servers 102.

In some embodiments, each N-port 115 may be associated with one of external FC interfaces 124, and NPIV proxy module 122 may distribute login requests 103 over available ones of N-ports 115 by either weighting the available N-ports 115 based on a number of login requests previously distributed to N-ports 115, or by sorting external interfaces 124 based on the number of login requests previously distributed the N-ports 115. In these embodiments, NPIV proxy module 122 may forward login requests 103 to a selected external interface based on either the weighting or sorting. In these embodiments, each of N-ports 115 may be considered a port channel, although the scope of the invention is not limited in this respect.

In some embodiments, NPIV proxy switching system 104 may operate in an FC end-host mode. In the FC end-host mode, NPIV proxy module 122 may request multiple FCIDs for NPIV proxy switching system 104 to allow NPIV proxy switching system 104 to operate a single end-host for each of servers 102. In these embodiments, each FC switch 106 may see NPIV proxy switching system 104 as a single end host requesting multiple FCIDs for itself similar to an HBA implementing NPIV functionality.

In some embodiments, one or more of server interfaces 123 may be configured to intercept some or all login requests 103 from servers 102 and to send login requests 103 to NPIV proxy module 122. In some embodiments, login requests 103 may comprise FLOGI requests that request a FCID associated with F-port 117 of one of FC switches 106, although the scope of the invention is not limited in this respect. In these embodiments, login requests 103 may be received from HBAs 112 of servers 102. In some embodiments, login requests 103 may comprise frames configured in accordance with a particular FC standard, although the scope of the invention is not limited in this respect. Servers 102 and/or their associated HBAs 112 may be referred to as hosts.

In some embodiments, one or more of HBAs 112 may implement NPIV functionality by sending more than one login request 103 to server interfaces 123 to request more than one FCID. Although some HBAs 112 may implement NPIV functionality, the scope of the invention is not limited in this respect as there is no requirement that HBAs 112 implement NPIV functionality.

In some embodiments, NPIV proxy switching system 104 may operate in either the FC end-host mode discussed above or in FC switch mode. When operating in FC switch mode, the NPIV proxy operations of NPIV proxy module 122 may be disabled. For example, when NPIV proxy switching system 104 operates in FC switch mode, the state machines of NPIV proxy module 122 may configure hardware elements of NPIV proxy switching system 104 to functionally connect servers 102 to FC switches 106 by assigning FCIDs directly to the HBAs 112. In FC switch mode, servers 102 and FC switches 106 may operate as if they were directly connected with a cable or direct communication link, although the scope of the invention is not limited in this respect. When NPIV proxy switching system 104 operates in FC switch mode, NPIV proxy module 122 may refrain from distributing login requests 103 received from servers 102 over the N-ports 115 and may further refrain from operating as the single end-host for each of the servers 102. When NPIV proxy switching system 104 operates in FC switch mode, NPIV proxy switching system 104 may operate as an FC switch.

In some embodiments, the state machines of NPIV proxy module 122 may comprise a FLOGI finite state machine (FSM) which may be started for each login request, and an external interface state machine which may be started for each external interface 124, although the scope of the invention is not limited in this respect. In some embodiments, the state for each login session may be handled by one of the FSMs. External events, including FLOGI requests, logout (LOGO) requests, interface up/down events, VSAN added, and deleted events, etc., may feed into these state machines to cause actions and state transitions. These embodiments are discussed in more detail below.

In accordance with some embodiments, NPIV proxy module 122 may capture login/logout associated packets received from servers 102 through server interfaces 123, and/or through external interfaces 124 which may be enabled for N-Port or NPIV functionality. Examples of login/logout associated packets include login requests 103 (e.g., FLOGIs), logout requests, responses for login and logout requests (e.g., LS_ACC and LS_RJT responses), although the scope of the invention is not limited in this respect. NPIV proxy module 122 may perform intelligent load balancing of the login sessions associated with login requests 103 over external interfaces 124 to uniformly distribute login requests 103 over N-ports 115. These embodiments are described in more detail below.

In some embodiments, NPIV proxy module 122 may provide retry functionality for sending a login request 103 on a different external interface 124 when a login request on one of external interfaces 124 fails, although the scope of the invention is not limited in this respect.

In accordance with some embodiments, NPIV proxy module 122 may provide high-availability (HA) functionality via process restart and switchover, although the scope of the invention is not limited in this respect.

In some embodiments, NPIV proxy module 122 may communicate and process packets in accordance with one or more FC standards including, for example, the FC-DA-2, FC-FS-2, and/or FC-LS-1.2 standards, although the scope of the invention is not limited in this respect. In some embodiments, NPIV proxy module 122 may maintain the same external behavior for each of HBAs 112 and FC switches 106 in failure scenarios so that HBAs 112 and FC switch 106 believe they are directly connected to each other.

In some embodiments, FC switches 106 may run Switch Fabric Internal Link Services (SW-ILS) to get a domain ID associated with one of FC networks 108. HBAs 112 may be assigned to one of FC networks 108 allowing each FC network 108 to serve as an alternate path to target devices 118. In some embodiments, some of target devices 118 may comprise discs to store/backup data for use by servers 102.

Figure 2:
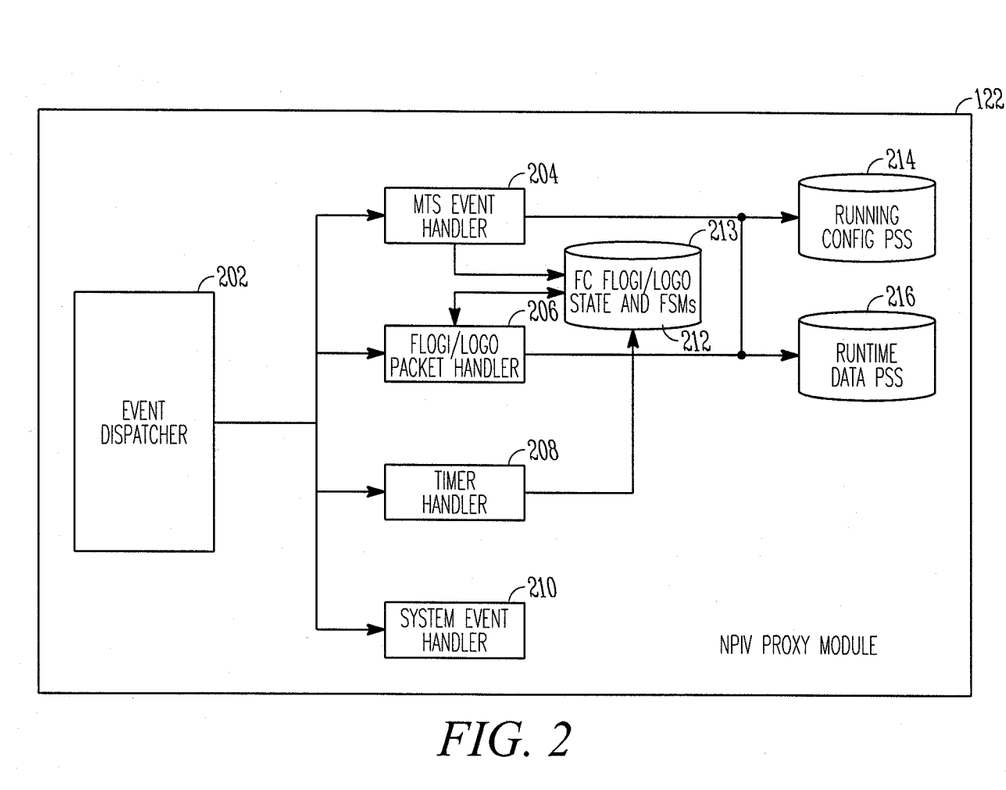
FIG. 2 is a block diagram illustrating functional elements of an NPIV proxy module in accordance with some embodiments of the present invention.

FIG. 2 is a block diagram illustrating functional elements of an NPIV proxy module in accordance with some embodiments of the present invention. NPIV proxy module 122 may correspond to NPIV proxy module 122 (FIG. 1), although other configurations may also be suitable. As illustrated in FIG. 2, NPIV proxy module 122 may include a plurality of modules including event dispatcher 202, MTS event handler 204, FLOGI/LOGO packet handler 206, timer handler 208, and system event handler 210. As discussed above, NPIV proxy module 122 may also comprise several state machines. As illustrated in FIG. 2, NPIV proxy module 122 may comprise FLOGI/LOGO FSM 212 which may be started for each login request 103, and external interface FSM 213 which may be started for each external interface 124 (FIG. 1) associated with a login request.

Event dispatcher 202 may communicate with server interfaces 123 (FIG. 1) and external interfaces 124 (FIG. 1) to dispatch packets to one of the other modules. FLOGI/LOGO packet handler 206 may handle packets comprising login requests 103 (FIG. 1) and logout requests received from servers 102 (FIG. 1). MTS event handler 204 may handle message and transactional services (MTS) events. Timer handler 208 may be used for scheduling queues and timeout for state machines 212 & 213. System event handler 210 may handle events associated with external interfaces 124 (FIG. 1), and may generate proxy logouts when server interfaces 124 (FIG. 1) and/or VSANs go up and down.

NPIV proxy module 122 may also include running configuration persistent storage system (PSS) element 214 to store configuration information for state machines 212 & 213, and runtime data PSS element 216 to store runtime information for state machines 212 & 213. Elements 214 and 216 may also maintain information related to the dynamic FLOGI/LOGO state for each login session from servers 102 (FIG. 1) and information related to login requests 103 (FIG. 1) received from servers 102 (FIG. 1) queued per external interfaces 124 and/or the VSAN.

Although NPIV proxy switching system 104 (FIG. 1) and NPIV proxy module 122 are illustrated as having several separate functional elements (e.g. modules and/or interfaces), one or more of these functional elements may be combined and may be implemented by combinations of software-configured elements, such as processing elements including digital signal processors (DSPs), and/or other hardware elements. For example, some functional elements may comprise one or more microprocessors, DSPs, application specific integrated circuits (ASICs), and combinations of various hardware and logic circuitry for performing at least the functions described herein. In some embodiments, the functional elements of NPIV proxy switching system 104 (FIG. 1) may refer to one or more processes operating on one or more processing elements. In some embodiments, the modules of NPIV proxy module 122 may comprise entirely software, although the scope of the invention is not limited in this respect. In some embodiments, NPIV proxy module 122 may comprise one or more software-implemented processes discussed in more detail below. These software processes may be implemented in DC-OS and may interact with a CPU packet I/O handler in the kernel (PF-FC) and other user space processes, although the scope of the invention is not limited in this respect. In some embodiments, NPIV proxy switching system 104 may be implemented as part of a top-of-rack switch (TORS) in a data center, although the scope of the invention is not limited in this respect.

Figure 3:
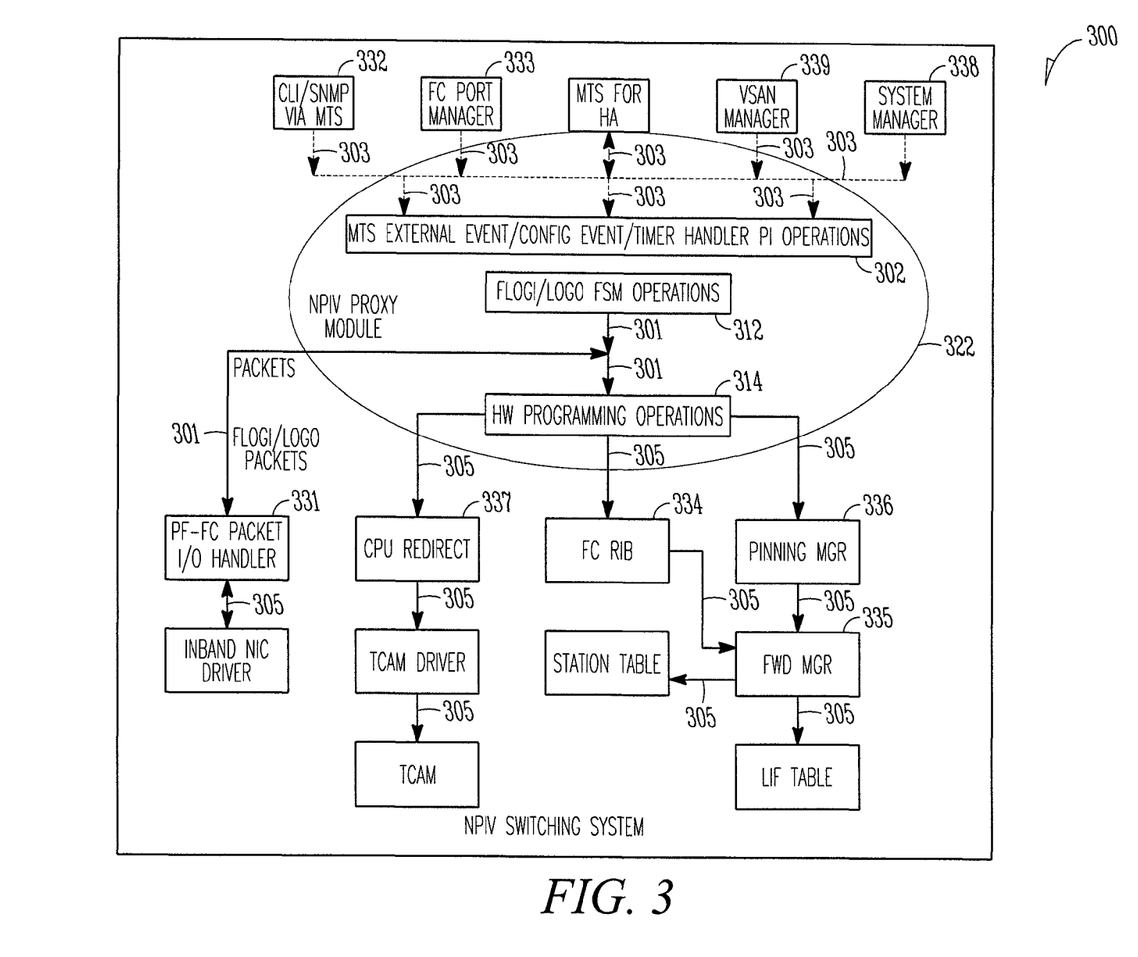
FIG. 3 is a system-flow diagram illustrating the operations of an NPIV proxy switching system in accordance with some embodiments of the present invention.

FIG. 3 is a system-flow diagram illustrating the operations of an NPIV proxy switching system in accordance with some embodiments of the present invention. System flow diagram 300 is a high level architecture diagram illustrating packet flow and inter-process interaction within NPIV-proxy module 122 (FIG. 1).

In FIG. 3, paths 301 illustrate FLOGI/LOGO packet flow and paths 303 illustrate inter-process interaction via MTS event handler 204 (FIG. 2). Paths 305 indicate hardware programming operations. In FIG. 3, the operations performed by NPIV proxy module 122 are illustrated within region 322. Operations 302 may comprise operations performed by event dispatcher 202 (FIG. 2), MTS event handler 204 (FIG. 2), packet handler 206 (FIG. 2), timer handler 208 (FIG. 2) and system event handler 210 (FIG. 2). Operations 312 may comprise operations performed states machines 212 (FIG. 2). Operations 314 may comprise operations for hardware programming. In some embodiments, the operations within region 322 may be platform independent, although the scope of the invention is not limited in this respect.

In accordance with embodiments, NPIV proxy module 122 (FIG. 1) may register for login packets with PF-FC I/O packet handler 331. Packet handler 331 may be a CPU handler and may reside in kernel space. NPIV proxy module 122 may program hardware with CPU redirect module 337 for login associated packets using an applications programming interface (API). The API also may be configured to provide parameters for configuring FLOGI and/or FDISC processing from the servers.

CLI/SNMP module 332 may interface with NPIV proxy module 122 using a CMI interface built on top of MTS. The CMI interface may provide configuration information as discussed below.

In some embodiments, NPIV proxy module 122 may query FC port manager 333 for list of server and external interfaces operating in N-port mode when the conditional service starts and may expect MTS notifications for changes in the interface state due to configuration changes or external events.

FC RIB manager 334 may populate the mapping of an FCID to server interfaces 123 on which a corresponding FLOGI was received. This mapping may be used to forward an FC data packet coming in on one of external interfaces 124 to the correct one of server interfaces 123 (FIG. 1).

FWD manager 335 may populate the mapping of server interfaces 123 to one of external interfaces 124. This mapping may be used to forward an FC data packet coming in on one of server interfaces 123 to the correct one of external interfaces 124. The mappings may be stored in one or more tables. This may be referred to server interface pinning and may be coordinated by pinning manger 336.

System manager 338 may monitor the health of the NPIV proxy process and may assist in the HA of NPIV proxy module 122. Since NPIV proxy module 122 may comprise FSM 122, interaction with system manager 338 may be transparent.

VSAN manager 339 may be used by NPIV proxy module 122 to derive VSAN membership on server interfaces 123 and external interfaces 124 via queries and notifications.

Figure 4:
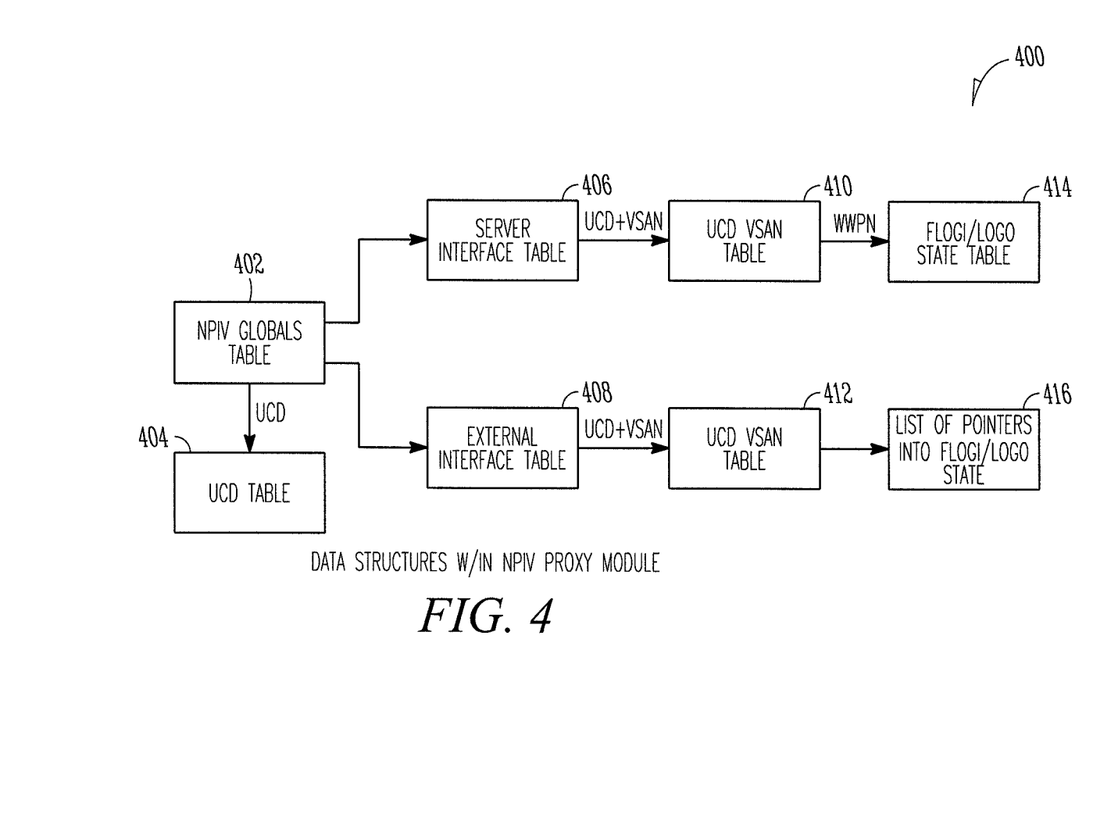
FIG. 4 illustrates data structures with the NPIV proxy module in accordance with some embodiments of the present invention.

FIG. 4 illustrates data structures with the NPIV proxy module in accordance with some embodiments of the present invention. As illustrated in FIG. 4, the data structures of NPIV proxy module 122 (FIG. 1) may be organized in a hierarchical manner, although the scope of the invention is not limited in this respect. Data structures 400 may include NPIV globals table 402, universal connectivity domain (UCD) table 404, server interface table 406, external interface table 408, UCD VSAN table 410, UCD VSAN table 412, FLOGI/LOGI state table 414, and list of pointers table 416. These data structures may be encapsulated in FLOGI/LOGO FSM 212 (FIG. 2) and external interface FSM 213 (FIG. 2). In some embodiments, external interface FSM 213 (FIG. 2) may reside in external interface table 408.

NPIV globals table 402 may holds global variables including global timer values and may include pointers to UCD table 404, which may be indexed by a UCD-ID, server interface table 406 that FLOGI/LOGO requests may be received from, and external interface table 408 which may comprise a table of external interfaces that connect to FC switches 106. UCD VSAN table 410 may comprise a table of allowed VSANs for server interfaces 123 (FIG. 1) and UCD VSAN table 412 may comprise a table of allowed VSANs for external interfaces 124 (FIG. 1). Each VSAN under an external or server interface may store the FLOGI/LOGO state for logins for the associated VSAN. Each VSAN under a server interface may store a table of all FLOGIs received from a server interface. Similarly each VSAN under an external interface may store a list of FLOGIs sent out on an associated external interface and VSAN. The list may be used to send proxy logouts to a server 102 (FIG. 1) on an external interface 124, or to send a VSAN down event.

In some embodiments, global data table 402 may maintain pointers to UCD VSAN tables 410 & 412, server interface table 406, and external interface table 408. Server interface table 406 may comprise a tree of server interface objects. Each server interface 123 (FIG. 1) may point to a hash table of the UCD VSAN tables 410 & 412.

VSAN table 410 may comprise a unique identifier (e.g., UCD, VSAN) for which a server VSAN object that is allocated. This structure may point to entries of FLOGI/LOGO state table 414 that has the FSM for each login session.

External Interface table 408 may maintains information for external interface 124 (FIG. 1) and may run a state machine for external interface 124 (FIG. 1) for handling events such as link-up, link-down, interface-deleted and the initial FLOGI generated by the NPIV Proxy for interface bring up, although the scope of the invention is not limited in this respect.

UCD VSAN table 412 may comprise an external VSAN object to maintain a per VSAN state on external interface 124 (FIG. 1). Table 412 may include a queue for all FLOGIs queued on each external interface and VSAN. This queue may enable the serialization of FLOGI/LOGO requests from NPIV-proxy module 122 (FIG. 1) to one of FC switches 106 (FIG. 1). This object also maintains a linked list of successful FLOGIs. This list is used to send proxy logouts on an interface down event.

List of pointers table 416 may comprise an FLOGI/LOGO object. This structure may run FSM 212 for every FLOGI/LOGO request. In some embodiments, some runtime information may be stored in table 416 to drop timed-out packets, to send proxy logouts etc, although the scope of the invention is not limited in this respect.

Referring back to FIG. 2, after one or external interface 124 is selected, the FLOGI request may be queued on a per VSAN queue on the selected external interface. If the queued entry is the only entry in the queue, then the FLOGI/FDISC is sent to the external interface. If there are other entries in the queue, the queued FLOGI request may wait until it gets to the top of the queue.

The FLOGI request at the top of the queue may be waiting for a response from one of FC switches 106. If this response is an LS_ACC, then the received FCID may be used to update the hardware. There are two pieces of information that are updated in hardware. The first piece of information is the mapping of the received FCID to the server interface so that traffic coming in from the FC fabric is routed correctly to the server. This information is programmed in FC RIB 334 (FIG. 3). The second piece of information that is updated in hardware is the mapping of the server interface to the external interface so that all traffic coming in from the server is routed over the correct external interface. This information also called 'server interface pinning' information may be programmed using API's provided by the platform independent portion of the forwarding manager. Once hardware programming is complete, the LS_ACC is forwarded back to the server.

If the response is LS_RJT and the error code is "Unable to perform command request due to insufficient resources", the NPIV Proxy Manager will re-try the FLOGI on a different interface. The decision to re-try FLOGI on a different interface may be a function of time taken for the LS_RJT response to come back and a configurable retry timer. For some other error codes, the LS_RJT may be forwarded back to the server interface. If there is no response from the FC switch the FLOGI may be re-tried on a different external interface again depending on a configurable timer. In some embodiments, NPIV proxy module 122 may generate proxy LOGOs when an external interface or a server interface goes down.

In some embodiments, the following algorithm may be used to pick an external interface 124 used to forward a FLOGI request received from server interfaces 123. If the external interface is explicitly configured by the user and if this interface and VSAN are up, pick this interface. If the external interface is not UP or the VSAN does not exist, an error may be generated and the FLOGI request may be dropped. If no external interface is explicitly configured but an external interface was already chosen but the FLOGI request did not succeed, the same external interface for the FLOGI request may be chosen. If no external interface was already chosen, a list the external interfaces that are in this UCD and VSAN may be used to chose. Note that the external interfaces 124 that are not up are eliminated. External interfaces 124 may be eliminated which have encountered "out of resources" and "waiting for response timed out" failures. If the external interface 124 is a port channel, the port channel may be given a weight equal to the number of component links in the port channel and proportionally greater number of FLOGIs are pinned to this port channel. External interfaces 124 may be sorted to identify the interface which has the least number of FCIDs used. When there are multiple external interfaces 124 with an equal number of FCIDs, the external interface 124 may be selected from these at random.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Some embodiments of the invention may also be implemented as instructions stored on a computer-readable medium, which may be read and executed by at least one processor to perform the operations described herein. A computer-readable medium may include any non-transitory mechanism for storing information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An N-port ID virtualization (NPIV) switching system to operate in either an FC end-host mode or an FC switch mode, the system comprising:
    an NPIV proxy module comprising circuitry to implement state machines for NPIV proxy operations;
    server interfaces comprising circuitry configured to intercept login requests from a plurality of servers and send the intercepted login requests to the NPIV proxy module, each login request requesting assignment of a fiber-channel identifier (FCID) for logging in to a fiber-channel (FC) switch of a plurality of FC switches; and external interfaces comprising circuitry and having a plurality of N-ports, each N-port coupled with an F-port of one of the FC switches;

wherein the state machines are configured to distribute the login requests over the plurality of N-ports allow the plurality of servers to be functionally coupled to an F-port of any of the FC switches, wherein the state machines, in response to each of the login requests, assign an FCID to each server to allow the NPIV proxy module to operate as a single end-host for each of the servers as the assigned FCIDs are associated with the NPIV proxy module and not associated with any particular FC switch when operating in FC end-host mode, wherein the state machines are configured to assign more than one FCID for a same N-port, wherein the state machines access data indicating a number of login requests previously distributed to the N-ports, and wherein the state machines distribute each of the login requests to a specific one of a plurality of available ones of the N-ports coupled with a corresponding plurality of the F-ports of the FC switches to achieve a substantially uniform distribution, wherein the specific N-port is selected by weighting the plurality of available ones of the N-ports based on a number of login requests previously distributed to the plurality of available ones of the N-ports.

2. The NPIV proxy switching system of claim 1 wherein each N-port is associated with one of the external interfaces, wherein the state machines further distribute the login requests over the plurality of available ones of the N-ports by, at least in part, sorting the external interfaces based on the number of login requests previously distributed to the N-ports.

3. The NPIV proxy switching system of claim 2 wherein the login requests comprise F-port login (FLOGI) requests that request a FCID associated with an F-port of one of the FC switches, and wherein the login requests are received from host bus adapters associated with the servers.

4. The NPIV proxy switching system of claim 3 wherein one or more of the HBAs of the servers implement NPIV functionality by sending more than one login request to the server interfaces to request more than one FCID.

5. The NPIV proxy switching system of claim 1 wherein when the NPIV proxy switching system operates in the FC switch mode, the NPIV proxy module refrains from distributing the login requests received from the servers over the N-ports and refrains from operating as the single end-host for each of the servers.

6. The NPIV proxy switching system of claim 3 wherein the state machines comprise:
a FLOGI finite state machine initiated for each login request, and
an external interface state machine initiated for each external interface.

7. The NPIV proxy switching system of claim 6 further comprising:
an event dispatcher to communicate with both the server interfaces and the external interfaces and dispatch packets comprising the login requests;
a packet handler to receive packets comprising the login requests and packets comprising logout requests from the event dispatcher;
a running configuration persistent storage system (PSS) to store configuration information for the state machines; and
a runtime data PSS to store runtime information for the state machines.

8. A method performed by an N-port ID virtualization (NPIV) proxy switching system that operates in either an FC end-host mode or an FC switch mode, the method comprising:
intercepting login requests received from server interfaces from a plurality of servers, each login request requesting assignment of a fiber-channel identifier (FCID) for logging in to a fiber-channel (FC) switch of a plurality of FC switches, the NPIV proxy switching system including a plurality of N-ports, each N-port coupled with an F-port of one of the FC switches;
sending the intercepted login requests to a NPIV proxy module comprising state machines for implementing NPIV proxy operations;
distributing, by the state machines of the NPIV proxy module, the login requests over the plurality of N-ports to allow the plurality of servers to be functionally coupled to an F-port of any of the FC switches; and
assigning, in response to each of the login requests, an FCID to each server to allow the NPIV proxy module to operate as a single end-host for each of the servers as the assigned FCIDs are associated with the NPIV proxy module and not associated with any particular FC switch when operating in FC end-host mode,
wherein the state machines are configured to assign more than one FCID for a same N-port,
wherein the state machines access data indicating a number of login requests previously distributed to the N-ports, and
wherein the state machines distribute each of the login requests to a specific one of a plurality of available ones of the N-ports coupled with a corresponding plurality of the F-ports of the FC switches to achieve a substantially uniform distribution, wherein the specific N-port is selected by weighting the plurality of available ones of the N-ports based on a number of login requests previously distributed to the plurality of available ones of the N-ports.

9. The method of claim 8 wherein each N-port is associated with one of a plurality of external interfaces,
wherein the login requests are further distributed over the plurality of available ones of the N-ports by, at least in part, sorting the external interfaces based on the number of login requests previously distributed to the N-ports.

10. The method of claim 9 wherein the server interfaces are configured to intercept the login requests from the one or more servers,
wherein the login requests comprise F-port login (FLOGI) requests that request a FCID associated with an F-port of one of the FC switches, and
wherein the login requests are received from the HBAs.

11. The method of claim 10 wherein one or more of the HBAs of the servers implement NPIV functionality by sending more than one login request to the server interfaces to request more than one FCID.

12. The method of claim 8 wherein when operating in the FC switch mode, the method comprises:
refraining from distributing the login requests received from the servers over the N-ports; and refraining from operating as the single end-host for each of the servers.

13. The method of claim 9 further comprising:
   initiating a FLOGI finite state machine for each login request, and
   initiating an external interface state machine for each external interface.

14. A computer-accessible storage device that provides instructions, which when accessed, configure an N-port ID virtualization (NPIV) proxy switching system to operate in either an FC end-host mode or an FC switch mode to perform operations to:
   intercept login requests received at server interfaces from a plurality of servers, each login request requesting assignment of a fiber-channel identifier (KID) for logging in to a fiber-channel (FC) switch of a plurality of FC switches, wherein for a plurality of N-ports, each N-port is coupled with an F-port of one of the FC switches; and
   send the intercepted server requests to a NPIV proxy module that includes state machines for implementing NPIV proxy operations configured to:
   distribute the login requests over the plurality of N-ports to allow the plurality of servers to be functionally coupled to an F-port of any of the FC switches; and
   assign, in response to each of the login requests, an FCID to each server to provide single end-host operations for each of the servers as the assigned FCIDs are associated with a single-end host and not associated with any particular FC switch when operating in FC end-host mode,
   wherein more than one FCID can be assigned for a same N-port,
   wherein the state machines access data indicating a number of login requests previously distributed to the N-ports, and
   wherein the state machines distribute each of the login requests to a specific one of a plurality of available ones of the N-ports coupled with a corresponding plurality of the F-ports of the FC switches to achieve a substantially uniform distribution, wherein the specific N-port is selected by weighting the plurality of available ones of the N-ports based on a number of login requests previously distributed to the plurality of available ones of the N-ports.

15. The computer-accessible storage device of claim 14
   wherein each N-port is associated with one of a plurality of external interfaces, and
   wherein the login requests are further distributed over the plurality of available ones of the N-ports by sorting the external interfaces based on the number of login requests previously distributed to the N-ports.

16. The computer-accessible storage device of claim 15 wherein when operating in the FC switch mode, the instructions configure the module to refrain from distributing the login requests received from the servers over the N-ports, and to refrain from operating as the single end-host for each of the servers.

17. The computer-accessible storage device of claim 16 wherein the instructions, when further accessed cause the machine to:
   initiate a FLOGI finite state machine for each login request, and
   initiate an external interface state machine for each external interface.

18. The NPIV proxy switching system of claim 1, wherein during the FC end-host mode, the state machines cause the NPIV proxy module to request multiple FCIDs from the FC switches for the NPIV proxy switching system to allow the NPIV proxy switching system to operate as the single end-host for each of the servers, and
   wherein during the FC switch mode, the state machines configure hardware elements of the NPIV proxy switching system to functionally connect the servers to the FC switches by assigning FCIDs directly to host-bus adaptors (HBAs) of the servers.

* * * * *